United States Patent [19]

Iltis

[11] Patent Number: 4,683,904
[45] Date of Patent: Aug. 4, 1987

[54] MOISTURE SENSOR

[75] Inventor: Rumult Iltis, La Jolla, Calif.

[73] Assignee: Ranya L. Alexander, San Diego, Calif.

[21] Appl. No.: 646,640

[22] Filed: Aug. 30, 1984

[51] Int. Cl.[4] ............................................ A01G 25/16
[52] U.S. Cl. .............................. 137/78.3; 137/624.11; 239/63; 239/64; 331/65; 361/178; 361/196; 361/203; 324/61 QL
[58] Field of Search ...................... 239/63, 64; 324/65, 324/61 R, 61 QL; 331/65; 361/178, 203, 195, 196; 137/78.3, 78.2, 624.11; 340/604

[56] References Cited

U.S. PATENT DOCUMENTS

| | | | |
|---|---|---|---|
| 3,418,571 | 12/1968 | Kenichi Isoda et al. ...... | 324/61 QL |
| 3,483,437 | 12/1969 | Coyne ................... | 361/203 |
| 3,771,548 | 11/1973 | Rauchwerger ...................... | 340/604 |
| 3,824,460 | 7/1974 | Gustafson ........................... | 340/604 |
| 3,875,525 | 4/1975 | Ballinger et al. ..................... | 331/65 |
| 3,882,381 | 5/1975 | Gregory ........................... | 324/61 R |
| 3,991,375 | 11/1976 | Riggs et al. ........................... | 239/64 |
| 4,012,673 | 3/1977 | Saarem et al. ...................... | 361/196 |
| 4,256,133 | 3/1981 | Coward et al. ............... | 137/624.11 |
| 4,514,722 | 4/1985 | Batcheler et al. .................... | 340/604 |

Primary Examiner—A. Michael Chambers
Attorney, Agent, or Firm—Baker, Maxham & Jester

[57] ABSTRACT

A moisture sensor having an oscillator circuit with its output frequency directly proportional to moisture percentage present in the substance of interest, such as soil. The oscillator circuit includes two spaced plates in the substance which function as a capacitor. The frequency of the oscillations changes as the capacitance between the plates changes due to the moisture present between the plates. The sensor is particularly adapted for use as a soil moisture detector and provides indications of moisture percentage or end points such as wet or dry conditions.

14 Claims, 2 Drawing Figures 4,683,904

MOISTURE SENSOR

FIELD OF THE INVENTION

This invention relates generally to moisture sensors and more particularly to a moisture sensor having an oscillator with a frequency varying with moisture percentage.

BACKGROUND OF THE INVENTION

Lawn watering is generally anything but a precise process. Many people water when the lawn looks dry or when they think of it. Alternatively, a watering system may be on a timer, whereby the lawn is watered at timed intervals, irrespective of whether or not it needs watering.

Apparatus to determine moisture content in various substances have been available in different forms and with varying degrees of success. For example, there are some devices which measure electrical resistance in the soil but these have generally not been satisfactory because resistance can vary with the type of elements in the soil and with the density of material. Thus the resistance value is not necessarily a true indication of percentage moisture. Further, the corrosive effects of soil may cause deleterious results on the electrodes used in such gauges. Tensiometers have been used, comprising a sealed, water-filled tube with a vacuum gauge on the upper end and a porous ceramic tip on the lower end. These are best suited to sandy soils but give sporadic readings if the soil becomes too dry. Tensiometers also tend to require frequent servicing.

Electrical resistance blocks or gypsum blocks are made with gypsum formed around a pair of stainless steel wires or wire grids that may be connected to a resistance meter. The moisture content of the gypsum, when placed in soil, approximates the moisture content in the soil and the flow of electricity between the wires indicates soil moisture content. Gypsum blocks are not particularly useful in sandy soils.

Neutron probes are relatively expensive but are more accurate than most other moisture sensors. This device employs a radioactive source emitting neutrons that are slowed by collisions with hydrogen atoms, thereby indicating the relative water present. The procedure for using neutron probes is time consuming and requires special training in handling and using the equipment.

Finally, moisture content may be determined by gravimetric sampling, a time consuming process involving driving off the moisture in a soil sample by drying in an oven.

The least precise and likely most used test is feel and visual observation; an experienced irrrgator can provide an estimate of moisture level with a reasonable and useful degree of accuracy.

A simple, inexpensive and practical system for accurately sensing moisture percentage in media such as earth, in order to provide indications which may be adapted for controlling a lawn watering system, has not previously been available.

SUMMARY OF THE INVENTION

Broadly speaking, this invention relates to a moisture sensor and more particularly to such a sensor for a lawn or crop watering system where the extent of watering is based on the percentage of moisture in the soil, that is, on demand.

The system comprises a variable oscillator, the frequency of which is dependent on the capacitance between two spaced plates buried in the soil and connected in the oscillator circuit. The output of the oscillator is linearized by measuring the time constant of the circuit. The output of the oscillator is coupled through a buffer amplifier to indication or control means which are not part of this invention. For example, the output of this circuit could provide an indication of wet or dry soil conditions or percentage moisture in the soil. It could also provide a signal to a control circuit which turns a watering system on and off, depending on the circuit output. Further, the output signal could be applied to a computer for further controls and functions. One example of a control circuit being operated by this sensor is a lawn sprinkler system having a 24-volt AC power system and solenoid controlling the actual on and off operation. The output from the sensor of this invention can be applied to the control system to operate the sprinkler system solenoid.

The moisture sensor system of this invention can be easily calibrated to accomodate the particular areas of the capacitive sensor plates and the distance between them.

BRIEF DESCRIPTION OF THE DRAWING

The objects, advantages and features of this invention will be more readily appreciated from the following detailed description when read in conjunction with the accompanying drawing, in which.

DESCRIPTION OF THE PREFERRED EMBODIMENT

The sensor of this invention measures the bulk moisture in the substance of interest, such as soil which supports grass or crops. The bulk moisture is measured as the ratio of moisture to soil by weight, expressed in percent. This sensor determines the bulk moisture by measuring the dielectric constant of the soil between capacitor electrodes or plates, which dielectric constant is proportional to the moisture content. The soil, and consequently the moisture, between the plates need not be evenly distributed, but the dielectric constant is nevertheless a measure of that moisture. This sensor also is responsive to changes in the moisture in the soil, also as a function of the change in the dielectric constant of the soil between the capacitor electrodes.

Different plants require watering at different depths. As explained later herein, the capacitive plates of this invention can be buried at different depths to effect the proper irrigation. Unlike a tensiometer, which is adapted for a single location, operation of this sensor is independent of depth in the soil.

As will be explained hereinbelow, this sensor can have its output connected directly to a control solenoid or a computer for a direct action. On the other hand, a neutron sensor cannot be directly connected to such external devices without an interface. Normally these sensors are read in the field.

Figure 1:
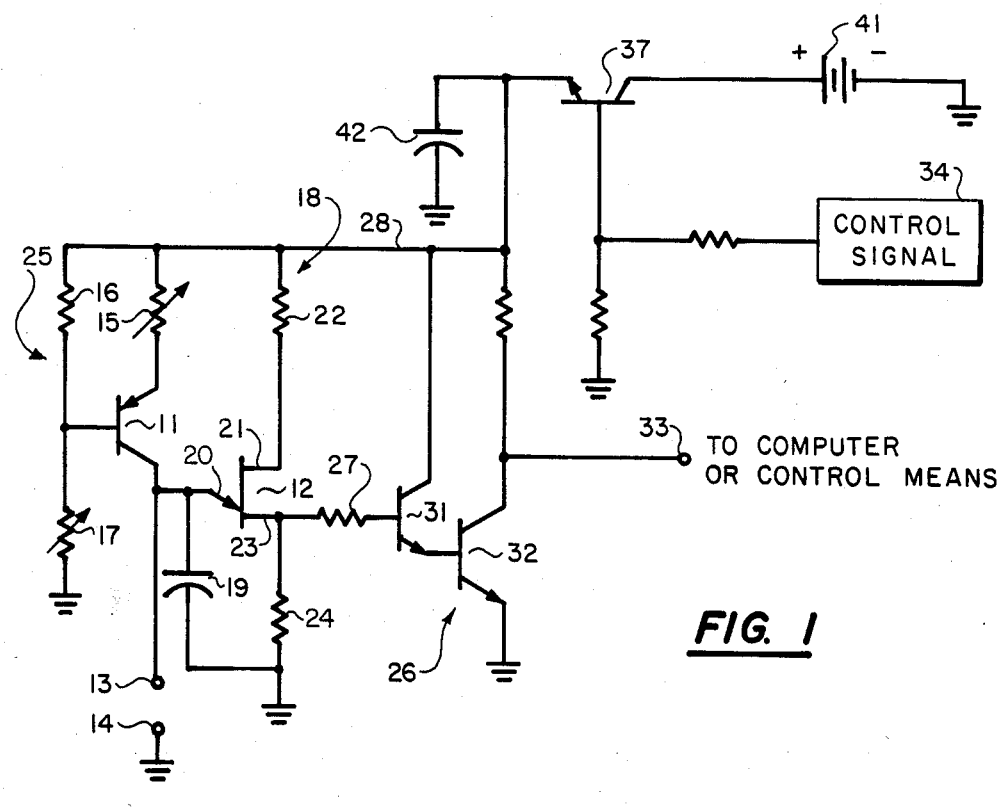
FIG. 1 is a schematic diagram of the moisture sensor of this invention.

With reference now to the drawing, and more particularly to FIG. 1, relaxation oscillator 18 comprises unijunction transistor 12, the basic or dry soil frequency being governed by capacitor 19 coupled between emitter 20 and ground, while base 23 is connected to ground through resistor 24. The capacitance which determines the operating frequency of oscillator 18 at any particular time is a combination of plates 13 and 14 buried in the soil, and capacitor 19. These capacitors are charged through resistor 15 which is the rate adjustment device for the sensor, to trigger transistor 12 for its pulsed output. As the substance between plates 13 and 14 gets more moist, the capacitance increases, and the plates take longer to charge, resulting in a longer pulse-to-pulse time between oscillator output pulses.

The charging current for the oscillator is supplied by constant current generator 25 comprising transistor 11, the base current for this transistor being supplied by resistor 16 and slope adjusting variable resistor 17. Adjustments to resistor 15 ensures a constant charging current to the oscillator, and maintains linearity of the charging current, thereby ensuring that the interpulse spacing of the oscillator output is linearly related to the capacitance of plates 13 and 14. Thus the pulse-to-pulse interval in seconds from oscillator 18 is directly proportional to the value of the variable capacitance of plates 13 and 14 which are buried in the ground. The sensing element itself comprises these two conductive plates buried in the ground spaced by approxiamtely two inches (5.1 cm) from each other. The plates may be buried at any desired level and six inches (15.2 cm) has been found to be a useful average depth. It should be noted that if it is desired to have the system produce a control signal to start the watering system when the lawn is less dry the plates should be more shallowly buried, whereas if it is desired to have the lawn be quite dry before the watering system is again started, the plates should be buried somewhat deeper. This is because dry or moist conditions are immediate at the soil surface and are delayed for a period of time relatively directly proportional to the depth at which the sensor plates are buried.

One of the plates could be made of a typical printed circuit board with the foil totally insulated from the soil by epoxy or enamel paint or some other suitable substance. The other board could be made of medical grade stainless steel. The plates can be any suitable size, such as about $3 \times 6$ inches or $8 \times 16$ cm. The dielectric constant of the soil and the plates form a capacitor that increases its value with the increase of moisture in the soil. For reference purposes, the dielectric constant of dry soil is typically about 5 while the dielectric constant of water is about 80. When the soil between the plates is fully moist, the dielectric constant is in the range of 80 while anything less than a high level of moisture will result in a dielectric constant somewhat less than 80 but more than 5.

It should be noted that while the constant current generator improves the operation of the sensor, it is not required and resistor 15 could be connected directly to the emitter of the unijunction transistor. Assuming it is included, the collector of transistor 11 is connected to capacitor plate 13 while capacitor plate 14 is grounded. Rate adjustment variable resistor 15 is connected to the emitter of transistor 11, the other end of resistor 15 being connected to voltage bus 28. The base of transistor 11 is connected to ground through slope adjusting variable resistor 17 and to voltage bus 28 through resistor 16. The emitter of unijunction transistor 12 is connected to the collector of transistor 11. Base 21 of transistor 12 is coupled to the voltage bus through resistor 22. The output of relaxation oscillator 18 is coupled from base 23 of unijunction transistor 12 through resistor 27 to buffer amplifier 26. The amplifier is comprised of two NPN transistors 31 and 32 in a Darlington configuration, providing an output from the collector of transistor 32 at terminal 33. The purpose of the amplifier is to provide output pulses with significantly more energy than the pulses from oscillator 18, which are very low power.

The principle of detection by means of capacitor sensing plates 13 and 14 is relatively straightforward. The capacity value C of the two plates buried in ground can be expressed as:

$$C = \frac{K \epsilon_o A}{d} \qquad \text{(Eq. 1)}$$

where
K = the dielectric constant of the moist soil
$\epsilon_o$ = the permittivity of air in farads/meter
A = the area of one plate in square meters
d = the distance between the plates in meters, and
C = the capacity in farads.

Note that when the system of this invention is set up, $\epsilon_o$, A and d are fixed values in Equation 1 so that K, which is the dielectric constant, is the only variable.

In operation, the pulse-to-pulse interval, in seconds, of relaxation oscillator 18 is directly proportional to the value of C. The rate of oscillation, for calibration purposes, can be adjusted with variable resistor 15 while variable resistor 17 is adjusted to obtain a linear correspondence between the value of C and percentage moisture content of the soil or ground. The rate of oscillation is inversely proportional to the value of C in the form:

$$\text{Rate} = \frac{1}{R \cdot C} \qquad \text{(Eq. 2)}$$

where R is the effective resistance of resistor 15 and transistor 11. The pulse-to-pulse interval T is directly proportional to C in the form:

$$T = R \cdot C \qquad \text{(Eq. 3)}$$

It is envisioned that power supply 41 would comprise two lithium batteries to provide approximately 7-volts DC which would be adequate for the entire sensor circuit. However, other power supply means could be used. For practical purposes, and to save energy, sensing by means of the sensor of this invention can be set to occur periodically. Control signal block 34 injects a one-second pulse every ten minutes to the base of transistor 37 and that transistor acts as a switch. During the one-second pulse, the seven volts from battery 41 will be applied to bus 28, with capacitor 42 functioning as a smoothing capacitor. Alternatively, a direct power supply from an outside source could be used, but the system shown in FIG. 1 has the advantage of isolation from a main power source, with attendant safety features. Of course, the sensor could be made to operate continuously, in which case control signal 34 would not be used. Also, the period between actuations of the sensor and the duration of sensing could be as desired.

Figure 2:
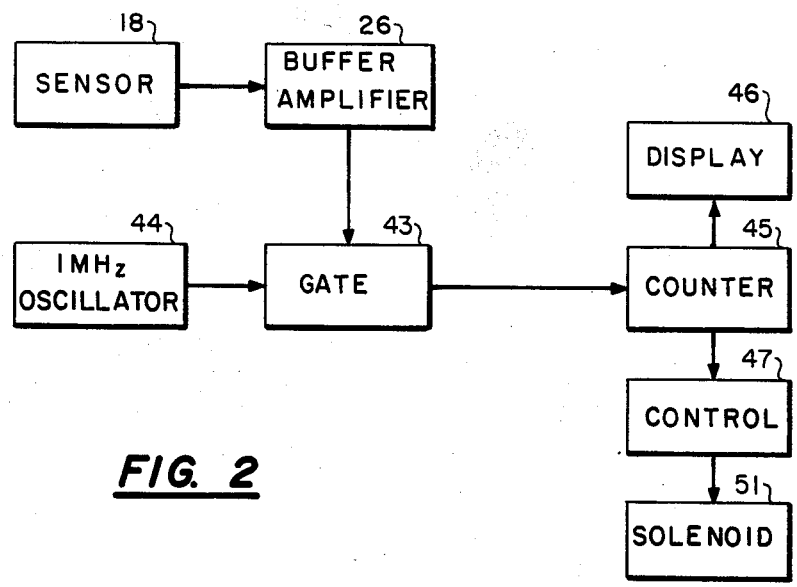
FIG. 2 is a block diagram of an example of a practical system employing the invention.

An example of a system employing the sensor of FIG. 1 as shown in FIG. 2. The FIG. 1 sensor is represented by block 18, feeding buffer amplifier 26. The pulses from amplifier 26 are coupled to gate 43, comprising a flip-flop. The first pulse enables gate 43 and the second disables the gate. A reference 1 MHz signal is constantly being applied to the gate from oscillator 44 and the interpulse distance of the pulses from amplifier 26 determines the number of pulses from oscillator 44 passed by gate 43.

The output from the gate is applied to counter 45 which may have a visual display 46. This could be adapted to show moisture percentage. The counter can be set, with a set point, to provide an operational signal to control 47 which is coupled to an actuating device such as solenoid 51. At a predetermined pulse count, resulting from the pulse-to-pulse interval from sensor 18, the counter emits a first or operational signal. At a different predetermined pulse count, or a second set point, a second signal is emitted from the counter.

A dry condition may result in a frequency of approximately 1000 Hz, while the moist condition may result in a frequency of about 330 Hz. Of course, these frequency values are examples only. In a dry condition, the relatively small number of counts from counter 45 results in the first signal output from control 47, actuating solenoid 51 in a known manner to start watering the soil. When the pulse-to-pulse interval is larger, resulting in more counts through gate 43, a predetermined number of counts will result in a second signal from control 47, disabling solenoid 51 and turning off the watering system.

It should be noted that either display 46 or solenoid 51, which can be used together, independently, or not at all in the system, constitute indication means since they indicate the moisture level condition of the soil. Other devices could be connected to the sensor output as desired.

For calibration of the sensor system, it is noted from Equation 3 that the interval T is proportional to capacitance C.

Prior to operation, the counter is preset with the number of counts as obtained with dry soil during time interval T equal to N2. The number of counts accumulated during the time T is N1 and is related to the moisture level. By adjusting resistors 15 and 17, the percentage of moisture content in the soil M is expressed as:

$$M = N2 - N1. \qquad \text{(Eq. 4)}$$

When M is equal to N1 or less, a signal is emitted at terminal 33 which may provide an indication that the threshold level of low moisture or dryness has been reached, or it may simply actuate the watering system solenoid or other control device to actuate the sprinkler system. This method of measurement is particularly suitable for small areas of irrigation such as a home owner's lawn.

The circuitry contemplated for this invention can easily be formed by means of CMOS logic or with a simple one chip microprocessor. For larger areas of irrigation, a number of sensors located in strategic locations can be fed by means of an interface to a computer. The computer is programmed for an efficient and optimal management of the irrigation system. In this case, the measurement of moisture is simpler since the pulses from the relaxation oscillator can be fed directly through the buffer to the computer. The internal clock can be used to measure the length of time interval T. There is no need to adjust variable resistors 15 and 17. The percentage of moisture content is obtained by multiplying the difference (N2−N1) by a proportionality factor A, in the form:

$$M = A(N2 - N1). \qquad \text{(Eq. 5)}$$

In view of the above description, it is likely that improvements and modifications to this invention will occur to those skilled in the art which are within the scope of the accompanying claims. It is contemplated that the invention can be more broadly employed than simply as a soil moisture sensor and could be used in various circumstances where moisture in a substance may be of interest. Examples are a food or grain silo or a concrete wall or floor, where moisture percentage could be a useful bit of information. Of course there are many other possibilities, including the human body, where the principles of this sensor may be applicable. Instead of indication means including a counter as shown in FIG. 2, it is possible that a frequency-to-voltage converter, controlled with a simple potentiometer, could be coupled to the output of the sensor.

What is claimed is:

1. A moisture sensor for detecting percentage moisture in a substance, said sensor being adapted to be coupled to an indication means and comprising:
   a source of electrical power;
   a variable frequency oscillator coupled to said power source and having a pulsed output, said oscillator comprising:
   a first transistor having an emitter and a first base; and
   a first variable resistor coupled between said power source and said emitter, the charging current to said capacitance means being governed by said first variable resistor;
   capacitance means in said oscillator, said capacitance means having electrodes of fixed size and spacing, the capacitance value of said capacitance means being responsive to the dielectric constant between said electrodes, said dielectric constant being a function of the percentage moisture between said electrodes, the pulse-to-pulse interval of the output pulses of said oscillator being linearly related to the capacitance value of said capacitance means;
   a constant current generator connected to said oscillator and providing a constant charging current to said capacitance means, said constant current generator comprising:
   a second transistor having a base, a collector and an emitter; and
   a second variable resistor connecting said base to ground, said base being coupled to said power source;
   means for coupling the output of said oscillator to said indication means to indicate relative moisture content of the substance;
   whereby said first variable resistor controls oscillation rate and said second variable resister is adapted to be set to establish linearity between moisture percentage and the capacitance of said capacitance means.

2. A moisture sensor for detecting percentage moisture in a substance, said sensor being adapted to be coupled to an indication means and comprising:
   a source of electrical power;
   a variable frequency oscillator coupled to said power source and having a pulsed output, said oscillator comprising:
   a first transistor having an emitter and a first base; and
   a first variable resistor coupled between said power source and said emitter, the charging current to said capacitance means being governed by said first variable resistor;

said first transistor further comprising a second base and forming a unijunction transistor, the output of said oscillator being connected to said second base of said first transistor;

capacitance means in said oscillator, said capacitance means having electrodes of fixed size and spacing, the capacitance value of said capacitance means being responsive to the dielectric constant between said electrodes, said dielectric constant being a function of the percentage moisture between said electrodes, the pulse-to-pulse interval of the output pulses of said oscillator being linearly related to the capacitance value of said capacitance means; and means for coupling the output of said oscillator to said indication means to indicate relative moisture content of the substance.

3. A moisture sensor for detecting percentage moisture in a substance, said sensor being adapted to be coupled to an indication means and comprising:

a source of electrical power;

a variable frequency oscillator coupled to said power source and having a pulsed output:

timing means coupled to the ouput of said oscillator, said timing means having a set point, the input to said indication means depending on the value of said set point, said timing means comprising a counter preset with a predetermined number of counts directly related to the oscillation rate in a dry substance whereby when the number of clock pulsed counts in the pulse-to-pulse interval at the oscillator output is equal to a predetermined number with respect to the dry substance number of counts, the signal emitted from said sensor indicates a dry condition;

capacitance means in said oscillator, said capacitance means having electrodes of fixed size and spacing, the capacitance value of said capacitance means being responsive to the dielectric constant between said electrodes, said dielectric constant being a function of the percentage moisture between said electrodes, the pulse-to-pulse interval of the output pulses of said oscillator being linearly related to the capacitance value of said capacitance means; and means for coupling the output of said oscillator to said indication means to indicate relative moisture content of the substance.

4. The sensor recited in claim 3, wherein the moisture content M in the substance is expressed as:

$$M = N2 - N1$$

where N2 is the number of counter pulses occurring in the pulse-to-pulse interval T of the oscillator output with dry substance and N1 is the number of counter pulses occurring in time interval T for any moisture condition of the substance.

5. A moisture sensor for detecting percentage moisture in a substance, said sensor being adapted to be coupled to an indication means and comprising:

a source of electrical power;

a varibale frequency oscillator coupled to said power source and having a pulsed output, said oscillator comprising:

a first transistor having an emitter and a first base; and a first variable resistor coupled between said power source and said emitter, the charging current to said capacitance means being governed by said first variable resistor;

capacitance means in said oscillator, said capacitance means having electrodes of fixed size and spacing, the capacitance value of said capacitance means being responsive to the dielectric constant between said electrodes, said dielectric constant being a function of the percentage moisture between said electrodes, the pulse-to-pulse interval of the output pulses of said oscillator being linearly related to the capacitance value of said capacitance means;

a constant current generator connected to said oscillator and providing a constant charging current to said capacitance means, said constant current generator comprising:

a second transistor having a base, a collector and an emitter; and a second variable resistor connecting said base to ground, said base being coupled to said power source;

said collector of said second transistor is connected to said emitter of said first transistor and said first variable resistor is connected between said power source and said emitter if said second transistor; and means for coupling the output of said oscillator to said indication means to indicate relative moisture content of the substance;

whereby said first variable resistor controls oscillation rate and said second variable resister is adapted to be set to establish linearity between moisture percentage and the capacitance of said capacitance means.

6. The sensor recited in claim 5 wherein the capacitance value of said capacitance means is given by the expression:

$$C = \frac{K \epsilon_o A}{d}$$

where
K = the dielectric constant of the substance,
$\epsilon_o$ = the permittivity of air in farads/meter,
A = the area of one plate in square meters,
d = the distance between the electrodes in meters, and
C = the capacity in farads.

7. The sensor recited in claim 6, wherein the rate of oscillation, which is inversely proportional to capacitance C is given by the expression:

$$\text{Rate} = \frac{1}{R \cdot C}$$

where R is the effective resistance of said first variable resistor and said second transistor and where the pulse-to-pulse interval T is directly proportional to C, given by the expression;

$$T = R \cdot C.$$

8. A moisture sensor for detecting percentage moisture in a substance, said sensor being adapted to be coupled to an indication means and comprising:

a source of electrical power;

a variable frequency oscillator coupled to said power source having a pulsed output, said oscillator comprising:
   a first transistor having an emitter and a first base; and
   a first variable resistor coupled between said power source and said emitter, the charging current to said capacitance means being governed by said first variable resistor;
capacitance means in said oscillator, said capacitance means having electrodes of fixed size and spacing, the capacitance value of said capacitance means being responsive to the dielectric constant between said electrodes, said dielectric constant being a function of the percentage of moisture between said electrodes, the pulse-to-pulse interval of the output pulses of said oscillator being linearly related to the capacitance value of said capacitance means;
timing means coupled to said oscillator output, said timing means having a set point, the output of said timing means depending on the value of said set point;
the output of said timing means being coupled to said indication means to indicate relative moisture content of the substance; and
a constant current source comprising:
   a second transistor having a base, a collector and an emitter, said collector being coupled to said emitter of said first transistor; and
   a second variable resistor connecting said base to ground, said base being coupled to said power source;
whereby said first variable resistor controls oscillation rate and said second variable resistor is adapted to be set to establish the charging rate of said capacitance means.

9. The sensor recited in claim 8, wherein said first transistor of said oscillator further comprises a second base, said first transistor comprising a unijunction transistor, the collector of said second transistor being connected to the base of said first transistor, the output of said oscillator being connected to the first base of said second transistor.

10. The sensor recited in claim 8, wherein the substance is around and between the electrodes of said capacitance means, the dielectric constant of which changes with moisture in the substance.

11. The sensor recited in claim 10, wherein the capacitance value of said capacitance means is given by the expression:

$$C = \frac{K \epsilon_o A}{d}$$

where
   K = the dielectric constant of the substance,
   $\epsilon_o$ = the permittivity of air in farads/meter,
   A = the area of one plate in square meters,
   d = the distance between the electrodes in meters, and
   C = the capacity in farads.

12. The sensor recited in claim 11, wherein the rate of oscillation, which is inversely proportional to capacitance C is given by the expression:

$$\text{Rate} = \frac{1}{R \cdot C}$$

where R is the effective resistance of said first variable resistor and said second transistor and where the pulse-to-pulse interval T is directly proportional to C, given by the expression.

$$T = R \cdot C.$$

13. A moisture detector for detecting percentage moisture in a substance, said sensor being adapted to be coupled to an indication means and comprising:
   a source of electrical power;
   a variable frequency oscillator coupled to said power source and having a pulsed output;
   capacitance means in said oscillator, said capacitance means having electrodes of fixed size and spacing, the capacitance value of said capacitance means being responsive to the dielectric constant between said electrodes, said dielectric constant being a function of the percentage of moisture between said electrodes, the pulse-to-pulse interval of the output pulses of said oscillator being linearly related to the capacitance value of said capacitance means;
   timing means coupled to said oscillator output, said timing means having a set point, the output of said timing means depending on the value of said set point, said timing means comprising a counter preset with a predetermined number of counts directly related to the oscillation rate in dry substance whereby when the number of clock pulse counts in the pulse-to-pulse interval at the oscillator output is equal to a predetermined number with respect to the dry substance number of counts, the signal emitted from the circuit indicates a dry condition;
   the output of said timing means being coupled to said indication means to indicate relative moisture content of the substance.

14. The sensor recited in claim 13, wherein the moisture content M in the substance is expressed as:

$$M = N2 - N1$$

where N2 is the number of counter pulses occurring in the pulse-to-pulse interval T of the oscillator output with dry substance and N1 is the number of counter pulses occurring in time interval T for any moisture condition of the substance.

* * * * *